(12) United States Patent
Machani

(10) Patent No.: US 9,077,521 B2
(45) Date of Patent: Jul. 7, 2015

(54) METHOD AND SYSTEM FOR SECURE COMMUNICATION

(75) Inventor: Salah Machani, Thornhill (CA)

(73) Assignee: IMS HEALTH INC., Danbury, CT (US)

( * ) Notice: Subject to any disclaimer, the term of this patent is extended or adjusted under 35 U.S.C. 154(b) by 227 days.

(21) Appl. No.: 13/028,613

(22) Filed: Feb. 16, 2011

(65) Prior Publication Data
US 2011/0208965 A1    Aug. 25, 2011

(30) Foreign Application Priority Data

Feb. 24, 2010   (CA) .................................... 2694500

(51) Int. Cl.
*H04L 9/32* (2006.01)
*H04L 9/08* (2006.01)
*H04L 29/06* (2006.01)

(52) U.S. Cl.
CPC .......... *H04L 9/0838* (2013.01); *H04L 63/0435* (2013.01); *H04L 63/0838* (2013.01); *H04L 63/123* (2013.01); *H04L 9/0891* (2013.01); *H04L 9/3228* (2013.01); *H04L 9/3242* (2013.01); *H04L 2209/80* (2013.01)

(58) Field of Classification Search
USPC ............................ 713/155, 168–170; 380/229
See application file for complete search history.

(56) References Cited

U.S. PATENT DOCUMENTS

| 7,444,670 | B2 * | 10/2008 | Berger et al. ...................... 726/3 |
| 2006/0288209 | A1 * | 12/2006 | Vogler ........................... 713/168 |
| 2007/0005966 | A1 | 1/2007 | Aissi et al. |
| 2007/0106896 | A1 * | 5/2007 | Sandberg et al. ............. 713/170 |
| 2007/0130472 | A1 * | 6/2007 | Buer et al. ..................... 713/182 |
| 2007/0250710 | A1 * | 10/2007 | Thibadeau ..................... 713/168 |
| 2008/0240433 | A1 * | 10/2008 | Fahn et al. ..................... 380/255 |
| 2009/0103722 | A1 * | 4/2009 | Anderson et al. ............... 380/44 |
| 2009/0307767 | A1 * | 12/2009 | Semba ............................ 726/18 |
| 2010/0293378 | A1 * | 11/2010 | Xiao et al. ..................... 713/168 |
| 2011/0246770 | A1 * | 10/2011 | Badra et al. ................... 713/168 |

OTHER PUBLICATIONS

Michail et al., "Efficient implementation of the keyed-hash message authentication code (HMAC) using the SHA-1 hash function," Electronics, Circuits and Systems, 2004. ICESC 2004. Proceedings of the 2004 11th IEEE International Conference on 2004, pp. 567-570.*

Hamdane et al., "Using the HMAC-Based One-Time Password Algorithm for TLS Authentication," Network and Information Systems Security (SAR-SSI), 2011 Conference on 2011, pp. 1-8.*

(Continued)

*Primary Examiner* — Christopher Brown
*Assistant Examiner* — Roderick Tolentino
(74) *Attorney, Agent, or Firm* — Maldjian Law Group LLC; John Maldjian; Alexander D. Walter

(57) ABSTRACT

A system and method for secure communication is provided. Outgoing messages to another computing device are encrypted using a first shared key shared with said other computing device, and a first counter, said first shared key and said first counter being stored in storage of a computing device. Incoming messages from said other computing device are decrypted using said first shared key and a second counter stored in said storage of said computing device.

22 Claims, 10 Drawing Sheets

(56) References Cited

OTHER PUBLICATIONS

Canadian Office Action for related Canadian Patent Application No. 2694500, dated Apr. 25, 2014, 3 pages.

Housley, "Using Advanced Encryption Standard (AES) Counter Mode With IPsec Encapsulating Security Payload (ESP)", retrieved from http://tools.ietf.org/html/rfc3686, Internet Engineering Task Force (IETF), RFC 3686, Jan. 2004, 19 pages.

* cited by examiner

METHOD AND SYSTEM FOR SECURE COMMUNICATION

FIELD OF THE INVENTION

The present invention relates generally to computer security. More particularly, the present invention relates to a method and system for secure communication.

BACKGROUND OF THE INVENTION

With the increase in client-server communications, as well as the increase in the value of the data being communicated, there is a corresponding increase in the want and need for secure protocols for those communications. The ubiquity of mobile computing devices (more simply, "mobile devices") and the functionality and data they access and store has increased this need. While there are existing secure data transport protocols, such as Secure Socket Layer ("SSL") or Transport Layer Security ("TLS"), they are not suitable for all communications, data and environments. Additionally, they often require additional user authentication.

One-time passwords ("OTPs") are gaining popularity as a secure method of user authentication, particularly for financial transactions. However, OTPs do not, by themselves, provide confidentiality of data.

One method of communicating securely is set out in Canadian Patent Application Number 2,590,989. The method set out therein is suitable for many scenarios, but the length of the key used to encrypt messages is relatively short.

It is an object of this invention to provide a novel method and system for secure communication.

SUMMARY OF THE INVENTION

In accordance with an aspect of the invention, there is provided a method for secure communication, comprising:
encrypting outgoing messages to another computing device using a first shared key shared with said other computing device, and a first counter, said first shared key and said first counter being stored in storage of a computing device; and
decrypting incoming messages from said other computing device using said first shared key and a second counter stored in said storage of said computing device.

The method can include:
generating a first hash-based message authentication code from said first shared key and a first value of said first counter;
generating a second hash-based message authentication code from said first shared key and a second value of said first counter; and
generating a first encryption key as a first function of said first hash-based message authentication code and said second hash-based message authentication code,
wherein said encrypting comprises encrypting using said first encryption key.

The method can include:
generating a first one-time password using a second shared key and said first counter.

The first one-time password can be communicated to the other computing device to enable determination of the value of the first counter.

The first function can include at least a portion of a concatenation of the first and second hash-based message authentication codes.

The first encryption key can be combined with an initialization vector for encrypting the message. An initialization vector can be generated as a second function of at least one of the first and second hash-based message authentication codes, and the message can be encrypted using the first encryption key concatenated with the initialization vector. The initialization vector can be set as a portion of the second hash-based message authentication code.

The method can include:
communicating an identifier for the first shared key and the first counter with the encrypted message.

The method can include:
receiving a second one-time password from said other computing device; and
synchronizing said second counter using said second one-time password.

The method can include:
generating a third hash-based message authentication code from said first shared key and a first value of said second counter;
generating a fourth hash-based message authentication code from said first shared key and a second value of said second counter; and
generating a second encryption key as a first function of said third hash-based message authentication code and said fourth hash-based message authentication code,
wherein said decrypting comprises decrypting using said second encryption key.

In accordance with another aspect of the invention, there is provided a system for secure communication, comprising:
a computing device having a storage storing a first shared key, and a first counter and a second counter, and a processor executing an encryption module, said encryption module for encrypting outgoing messages to another computing device using the first shared key and for decrypting incoming messages from said other computing device using said first shared key and said second counter, said other computing device also storing said first shared key and said first and second counters.

The encryption module can generate a first hash-based message authentication code from the first shared key and a first value of the first counter, and a second hash-based message authentication code from the first shared key and a second value of the first counter, the encryption module generating a first encryption key as a first function of the first hash-based message authentication code and the second hash-based message authentication code, and encrypting one of the outgoing messages using the first encryption key, the encryption module causing the network interface to communicate the one encrypted outgoing message.

The encryption module can generate a first one-time password using a second shared key and the first counter. The computing device can communicate the first one-time password to the other computing device to enable determination of the value of the first counter.

The first function can include at least a portion of a concatenation of the first and second hash-based message authentication codes.

The encryption module can combine the first encryption key with an initialization vector for encrypting the one outgoing message. Further, the encryption module can generate an initialization vector as a second function of at least one of the first and second hash-based message authentication codes, and encrypts the one outgoing message using the first encryption key concatenated with the initialization vector.

The encryption module can set the initialization vector as a portion of the second hash-based message authentication code.

The encryption module can communicate an identifier for the shared key and the first counter with the one encrypted outgoing message.

The encryption module can synchronize the second counter with the other computing device using a second one-time password received therefrom. Further, the encryption module can generate a third hash-based message authentication code from the first shared key and a first value of the second counter, a fourth hash-based message authentication code from the first shared key and a second value of the second counter, and a second encryption key as a first function of the third hash-based message authentication code and the fourth hash-based message authentication code, wherein the encryption module decrypts one of the incoming messages using the second encryption key.

BRIEF DESCRIPTION OF THE DRAWINGS

An embodiment will now be described, by way of example only, with reference to the attached Figures, wherein.

DETAILED DESCRIPTION OF THE EMBODIMENT

The invention provides a system and method for secure communication between two computing devices. Each of the two computing devices employs a separate counter for generating encryption keys, message digests and/or one-time passwords for authentication. The two counters are used in combination with one or more shared keys in order to generate a session encryption keys that are used to encrypt messages between the two computing devices. By using separate counters, the two computing devices can communicate asynchronously with each other. This enables, for example, communications initiated by either party, as each party uses a separate counter for generating messages, without the risk of accidental use of the same counter value where one counter is used. In addition, multi-part requests or responses do not require the same number of corresponding messages in the other direction. Two hash-based message authentication codes ("HMACs") are generated using a shared key and two values of the initiating party's counter. A key for encrypting communications between two computing devices is then derived as a function of the two HMACs. As the HMACs are relatively long, the encryption key can be made fairly long. Further, an OTP generated using another shared key enables authentication of the initiating party's identity and synchronization of the initiating party's counter values between the two communicating computing devices. A message digest is generating using the initiating party's counter and a shared key. By generating a long encryption key for encrypting communications between the computing devices, the communications are less vulnerable to various types of cryptographic attacks.

Figure 1:
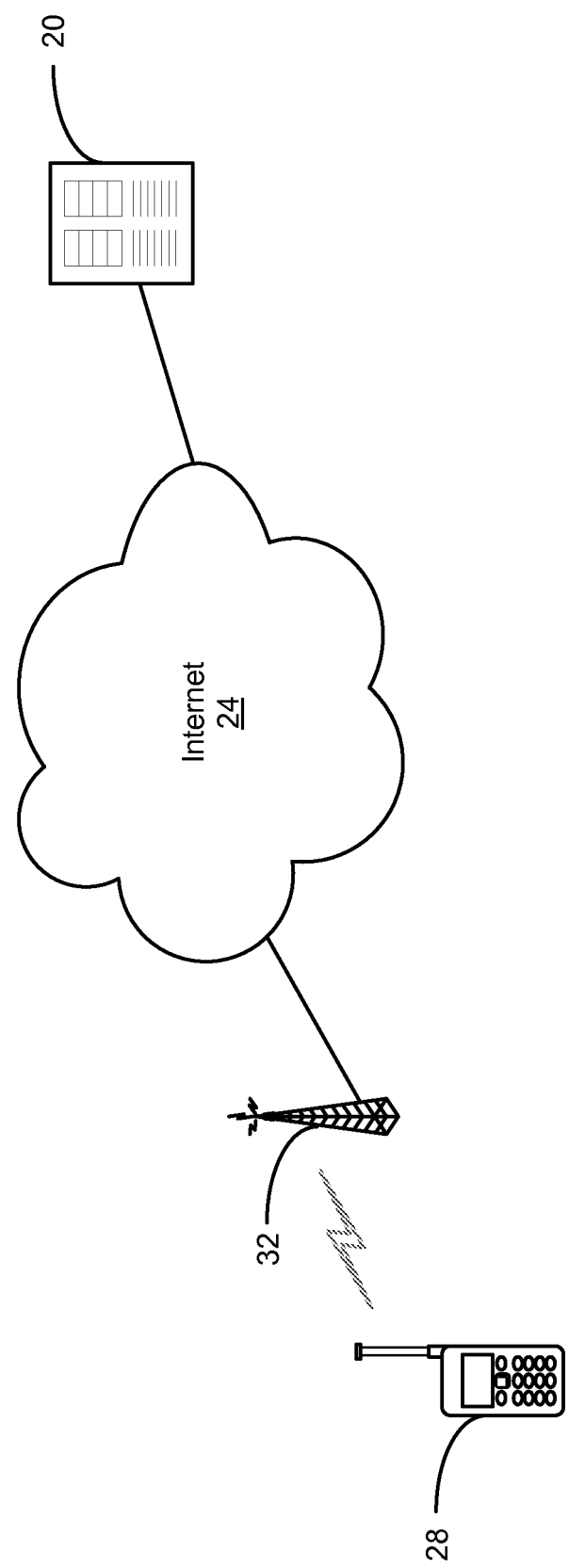
FIG. 1 shows a high-level architecture of a system for recovering a security credential in accordance with an embodiment of the invention and its operating environment.

FIG. 1 is a high-level architectural diagram of a system for secure communication and its operating environment in accordance with an embodiment of the invention. In this embodiment, the two computing devices that communicate securely are a server computer, or simply "server", and a mobile device. The mobile device acts as a client for accessing data and/or functionality available through the server via secure communication.

As shown in FIG. 1, the system includes a server 20 that generates shared secrets and encryption and decryption keys, and stores the decryption keys in a key database. While only one server 20 is shown, it will be appreciated by those skilled in the art that the functionality/service provided by the server 20 in the described embodiment can be provided by two or more server computers. Where there is more than one server, the servers can be in communication with one another over a local area network, or can be distributed remotely and in communication with each other via one or more communication networks. The server 20 is in communication with a large, public network, such as the Internet 24.

A mobile device 28 is also in communication with the Internet 24 via a cellular communications tower 32. In particular, the mobile device 28 communicates via cellular communications with the cellular communications tower 32 that, in turn, is in communication with the Internet 24 via a number of intermediate servers operated by one or more cellular communications carriers (not shown).

Figure 2:
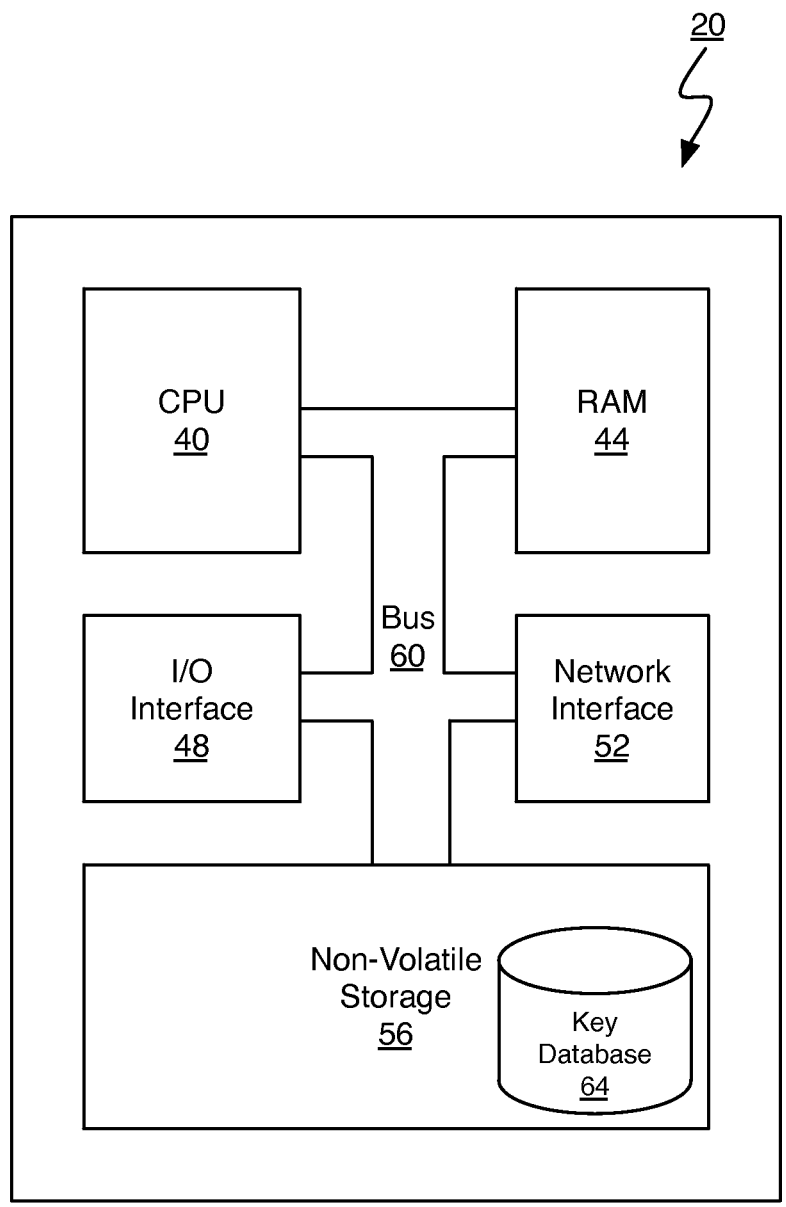
FIG. 2 shows a schematic diagram of the server of FIG. 1.

FIG. 2 shows a number of physical and logical components of the server 20, including a central processing unit ("CPU") 40, random access memory ("RAM") 44, an input/output ("I/O") interface 48, a network interface 52, non-volatile storage 56, and a local bus 60 enabling the CPU 40 to communicate with the other components. The CPU 40 executes an operating system and programs that provide the desired functionality. RAM 44 provides relatively responsive volatile storage to the CPU 40. The I/O interface 48 allows for input to be received from one or more devices, such as a keyboard, a mouse, etc., and outputs information such as to a display and/or speakers. The network interface 52 permits communication with other systems for sending messages to and receiving messages from the mobile device 28. Non-volatile storage 56 stores the operating system and applications. A key database 64 is maintained by the server 20 in the non-volatile storage and stores user account information, mobile device information and decryption keys associated with user accounts. The server 20 includes a Web interface for enabling users to register with the server 20. Further, the server 20 includes various installation versions of one or more client applications for installation on mobile devices, such as the mobile device 28. The versions enable installation of the client application on various types of mobile devices with varying versions of operating systems.

Figure 3:
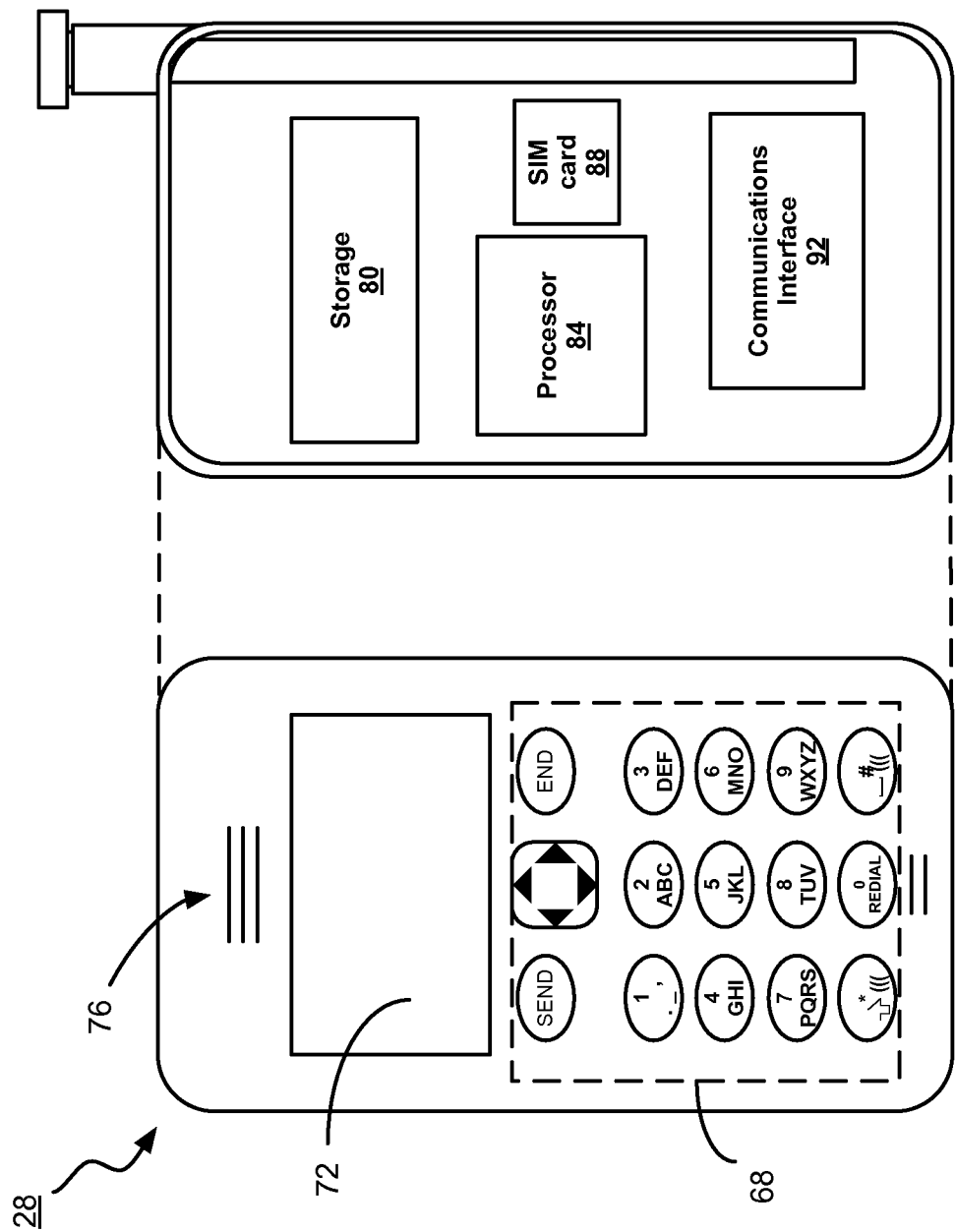
FIG. 3 shows a schematic diagram of the mobile device of FIG. 1.

Referring to FIG. 3, a number of components of the mobile device 28 are shown. The mobile device 28 is a typical mobile phone having basic functions. The mobile device 28 has an input interface 68 for receiving input from a user, a display 72 is provided for presenting information visually to the user, and a speaker 76 for playing audio notifications or other audio output, including voice output, to the user. The mobile device 28 also includes storage 80 for storing an operating system that controls the main functionality of the mobile device 28, along with a number of applications that are run on the mobile device 28, and data. A processor 84 executes the operating system and applications. A SIM card 88 provides additional memory for storing applications and data, and has a microprocessor for executing them. Additionally, the SIM card 88 has a unique hardware identification code that permits identification of the mobile device 28. When installed, the SIM card 88 forms part of the mobile device 28. Other types of mobile devices can have encrypted device memory in place of the SIM card 88 that offers the equivalent functionality. A communications interface 92 permits communications with a cellular network for voice and data. The communications interface 92 also enables communications via other wireless and wired channels, such as Bluetooth and universal serial bus ("USB").

The mobile device 28 executes an application, referred to herein as a client application, that includes an encryption module for securing communications with the server 20. In particular, in this embodiment, the client application, when executed, enables secure exchange of data via Global System for Mobile ("GSM") Short Message Service ("SMS") with the server 20. The client application is separate from the native application on the mobile device 28 for transmitting SMS messages. The client application is stored in the storage 80 of the mobile device 28 and executed by the processor 84 when activated by the user (such as by selecting and activating an associated icon in the user interface of the mobile device 28), and its encryption module encrypts communications sent to the server and decrypts communications sent by the server 20. As used herein with respect to this embodiment, the term "client" refers to the mobile device 28 that executes the client application.

Figure 4:
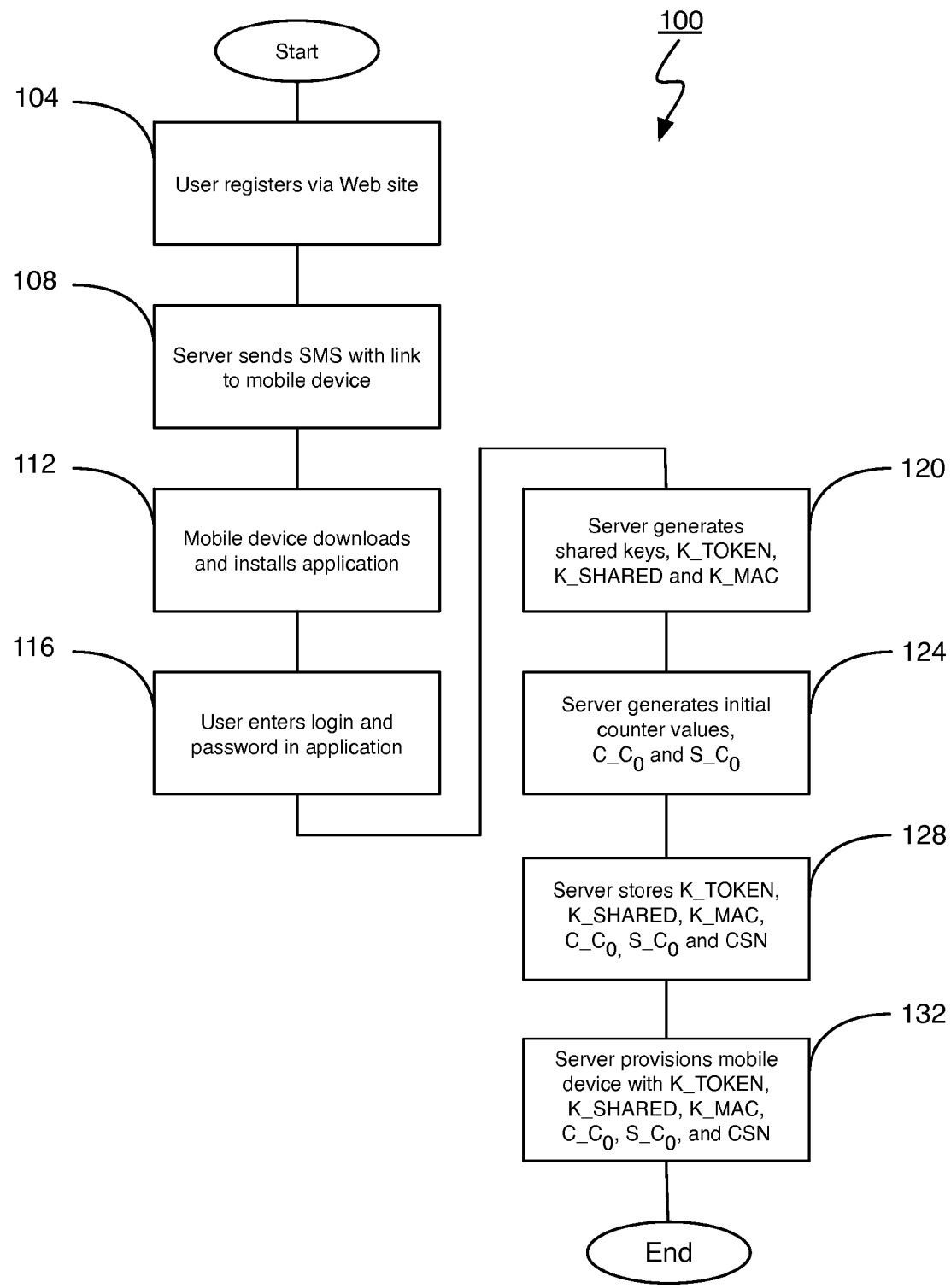
FIG. 4 shows the method of setting up the mobile device for use with the system of FIG. 1.

FIG. 4 shows the general method 100 of setting up the mobile device 28 for use with the server 20. In order to use the system, the user of the mobile device 28 registers with the server 20 via a Web page, either on the mobile device 28 or elsewhere (step 104). The Web page is part of a registration and administration interface for the security credential recovery service that is Web-based. During registration, the user provides his name, a login name and password, and the telephone number associated with the mobile device 28 with which he wishes to securely communicate with the server. In addition, the user is asked to accept an end-user license agreement ("EULA") and privacy policy before access to the server via the mobile device is provided. Once registration is complete, the server 20 sends a short message service ("SMS") message to the mobile device 28 that includes a link for downloading a client application (step 108). The SMS message is sent to the mobile device 28 via the telephone number provided by the user at step 104. Upon receipt of the SMS message and activation of the link, the mobile device 28 downloads the client application, after which it is installed on the mobile device 28 (step 112). The server 20 receives the download request, determines the type of mobile device, and operating system and/or software set versions if required, in order to deliver an appropriate version of the client application to the mobile device 28.

Once the client application is installed on the mobile device 28 and started up for the first time, the user is prompted for his login name and password (step 116). The client application transmits the user's login name and password securely to the server 20 and, once approved, the server 20 generates three shared keys, K_TOKEN, K_SHARED and K_MAC (step 120). K_TOKEN is a 20-byte key that is used in the process of authenticating the mobile device 28 and the server 20 to each other. K_SHARED is a 128-bit advanced encryption standard ("AES") key that is used to generate session encryption keys for encrypting communications between the mobile device 28 and the server 20. K_MAC is used to generate message digests for verifying that messages have not been tampered with or corrupted in some other way.

Each of these three keys is a 128-bit advanced encryption standard ("AES") key. Then, the server 20 generates two initial values for shared counters, $C\_C_0$ and $S\_C_0$ (step 124). C_C is the client counter used by the client to generate outgoing secure messages and used by the server to decode the secure messages once received. Similarly, S_C is the server counter used by the server 20 to generate outgoing secure messages and used by the client to decode the secure messages once received. The values for $C\_C_0$ and $S\_C_0$ are selected such that it is highly unlikely that the values of C_C and S_C will collide (i.e., be equal) at any time. In particular, $C\_C_0$ is set to be a randomly-generated integer between 0 and 1,000 and $S\_C_0$ is set to be a randomly-generated integer between 9,000,000 and 9,001,000.

Once the server 20 has generated the shared keys and counters, it generates an identifier for the security credentials (i.e., keys and counters) referred to as the credentials set number ("CSN"), for these security elements and stores it, the three shared keys and the two initialized shared counter values in the key database 64, together with the other user information (step 128). The server 20 then transmits the three shared keys, the two initialized shared counter values and the CSN to the mobile device 28 (step 124). Upon receipt of the shared keys, the initialized shared counter value and the CSN, the client application executing on the mobile device 28 initializes the encryption module and provides the shared keys, the initialized shared counter values and the CSN to the encryption module (step 128). The encryption module stores the shared keys, the initialized shared counter values and the CSN securely in the memory of the mobile device 28. At this point, the client application is ready to communicate securely with the server to access the functionality and/or data available thereon.

During regular operation, the user starts up the client application and enters in his login name and password. Upon receiving a request from the user to access functionality and/or data available through the server 20, the client application calls upon the encryption module to encrypt the request being sent to the server 20 and to decrypt the response sent by the server 20. Alternatively, the server 20 may send a push message to the mobile device 28 that requires decoding by the encryption module before it can be processed by the client application on the mobile device 28.

Figure 5:
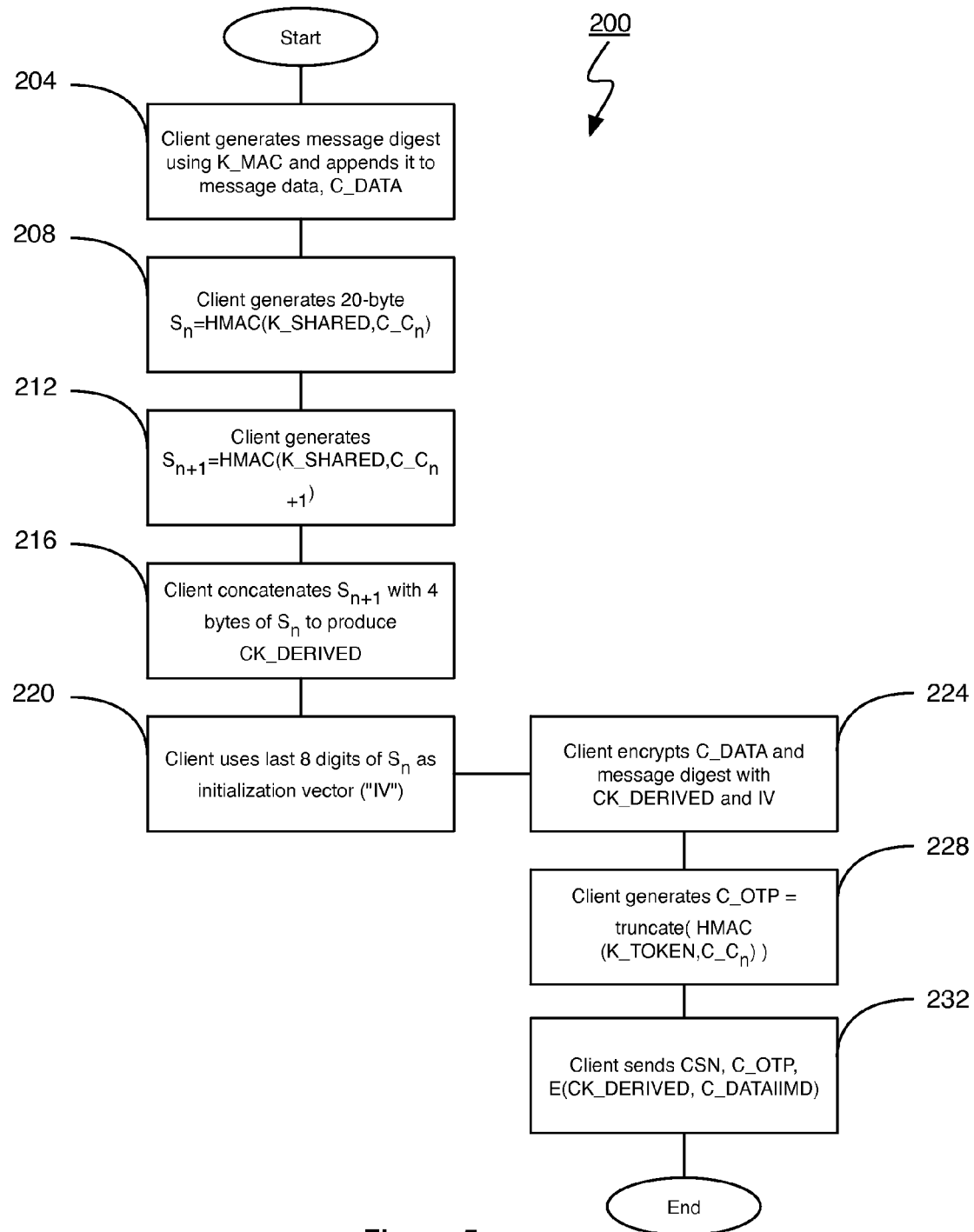
FIG. 5 shows the general method for generating a secure message via the client of the system of FIG. 1.

FIG. 5 illustrates the method employed by the mobile device 28 for generating and sending a secure message to the server 20 using the system shown in FIG. 1 generally at 200. The method begins with the client's encryption module generating a message digest, MD, for a message, referred to as C_DATA, to be sent to the server 20 using K_MAC and appending the message digest to the message (step 204). The message, C_DATA, takes the form of plain text data. The message digest is a 20-byte HMAC that is calculated as follows:

$$MD = HMAC(K\_MAC, C\_C_n),$$

where n is an incremental variable, and $C\_C_n$ is the $n^{th}$ (i.e., current) value of the client counter, C_C. The client counter, C_C, is initialized by the server 20 at a random value, $C\_C_0$, during provisioning and incremented sequentially for each use. The particular HMAC function employed in the embodiment is the HMAC-SHA-1 algorithm, as set out in IETF RFC 4226: HOTP: An HMAC-Based One-Time Password Algorithm, although other HMAC functions will occur to those skilled in the art.

The encryption module of the client then commences the generation of an encryption key by generating $S_n$, a 20-byte HMAC (step 208). In particular, $$S_n = HMAC(K\_SHARED, C\_C_n).$$

Again, the HMAC-SHA-1 algorithm is employed to generate the HMAC, $S_n$.

After generating $S_n$, the encryption module generates $S_{n+1}$, another 20-byte HMAC (step 212). In particular, $$S_{n+1} = HMAC(K\_SHARED, C\_C_{n+1}),$$

where $C\_C_{n+1} = C\_C_{n+1}$.

The encryption module then concatenates $S_{n+1}$ with the first eight bytes of $S_n$ to generate the session encryption key, CK_DERIVED (step 216). As the HMAC $S_{n+1}$ is 20 bytes in length, the resulting CK_DERIVED is 28 bytes in length. The encryption module then establishes an initialization vector ("IV") of the last eight bytes of the HMAC $S_n$ (step 220). The encryption module then encrypts the message, C_DATA, and the appended message digest, MD, using the derived encryption key, CK_DERIVED, concatenated with the initialization vector, IV (step 224). Specifically, 128-bit Advanced Encryption Standard ("AES") is used to encrypt C_DATA and the appended message digest, MD.

The client then generates a client OTP, C_OTP, to enable authentication of the client and the server 20 and synchronization of the client counter C_C with the server 20 (step 228). In order to generate C_OTP, the client counter value, $C\_C_n$, and K_TOKEN are used to generate an HMAC, using the SHA-1 algorithm. The HMAC is then processed using the truncate function, as described in IETF RFC 4226: HOTP: An HMAC-Based One-Time Password Algorithm. Thus, $$C\_OTP = Truncate(HMAC(K\_TOKEN, C\_C_n)),$$

where C_OTP is a six-digit code.

The client application then sends a message to the server 20 that includes CSN, C_OTP, and the encrypted message concatenated with the message digest, C_DATA||MD (step 232). The message is sent via SMS via the communications interface 92 of the mobile device 28.

Once the client has used a client counter value to generate a secure message, it will not be used again in the future. Thus, to generate the next secure message, the client uses $C\_C_{n+2}$ and $C\_C_{n+3}$ to generate the session encryption key.

Figure 6:
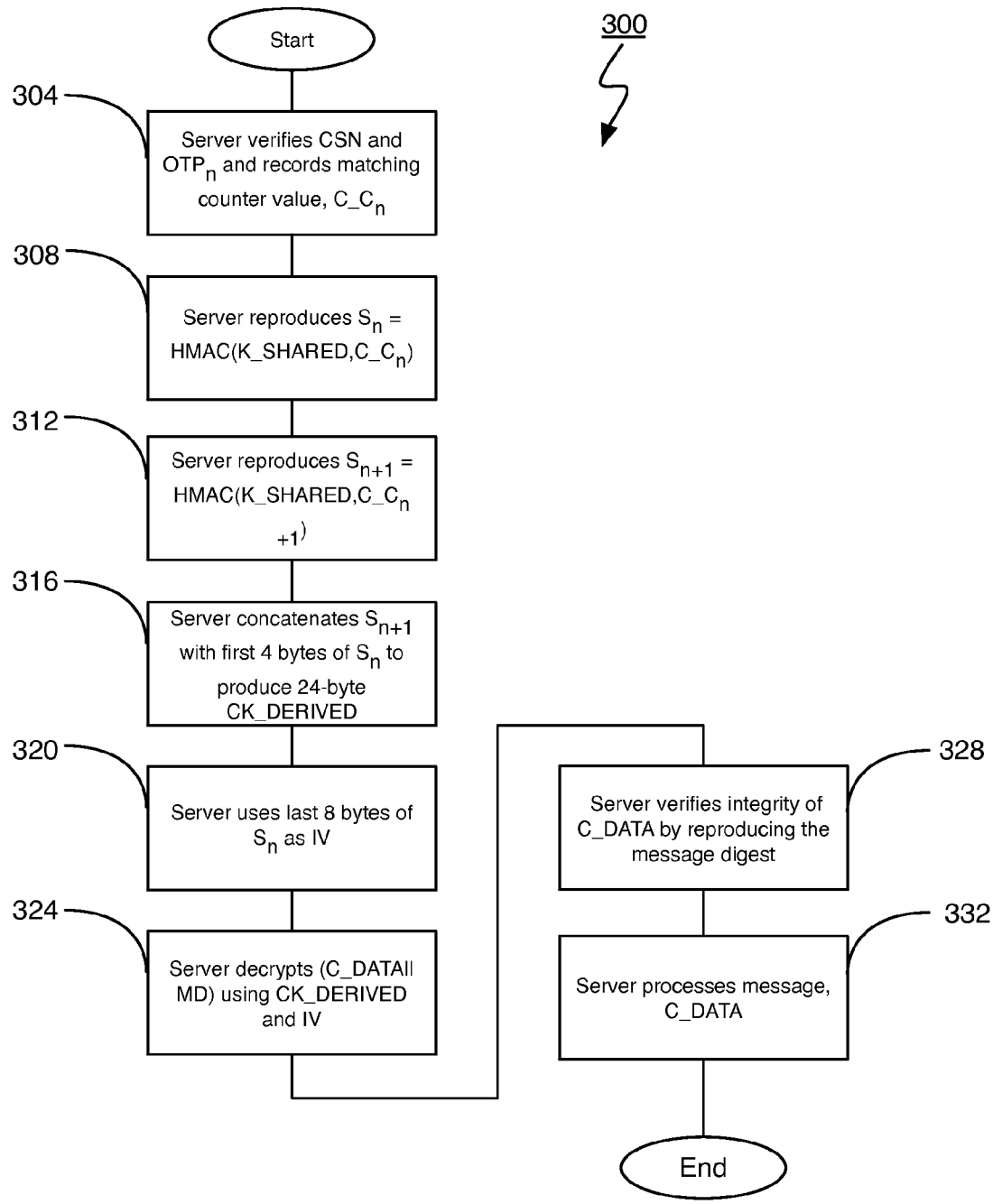
FIG. 6 shows the general method for processing a client-generated secure message via the server of the system of FIG. 1.

FIG. 6 illustrates the method 300 used by the server 20 to process the message received from the client as a result of the client generating and sending a message per the method shown in FIG. 5. Upon receipt of the message from the client, the server 20 verifies the CSN and C_OTP and records the matching client counter value (step 304). The server 20 verifies the CSN by checking to ensure that it matches a valid CSN stored in the key database 64. Once the CSN is verified, the corresponding keys and counter values are retrieved from the key database 64. The server 20 then increments the last registered value for the client counter, C_C, and generates a corresponding OTP using it and K_TOKEN as follows:

$$OTP = Truncate(HMAC(K\_TOKEN, C\_C_m)),$$

where $C\_C_m$ is the current expected value of the client counter.

If the OTP generated by the server 20 does not match C_OTP sent by the client, the client counter value, $C\_C_m$, is incremented by one and another OTP is generated by the server 20 and checked against C_OTP transmitted by the client, until either the OTP generated by the server 20 matches the C_OTP sent by the client or until a set number of iterations have been exhausted without success. If C_OTP is unmatched by the server 20, the server 20 responds to the client with an error code and stops processing the message. If, instead, C_OTP is matched by an OTP generated by the server 20, the corresponding client counter value, $C\_C_n$, is recorded. In this manner, the client counter values stored on the client and the server 20 can be synchronized.

Upon synchronizing the client counter value, the server 20 reproduces the first HMAC used to generate the decryption key using K_SHARED and $C\_C_n$ (step 308). Next, the server 20 increments the client counter value and reproduces the next HMAC using HMAC and $C\_C_{n+1}$ (step 312).

The server 20 then concatenates $S_{n+1}$ with the first eight bytes of $S_n$ to reproduce the session encryption key, CK_DERIVED (step 316). The resulting CK_DERIVED is a 128-bit AES key. The server 20 then reproduces the initialization vector ("IV") as the last eight bytes of the HMAC $S_n$ (step 320). The server 20 then decrypts the message and appended message digest, C_DATA||MD, using the derived encryption key, CK_DERIVED, concatenated with the initialization vector, IV (step 324). The server 20 then verifies the integrity of the message (step 328). Using the decrypted C_DATA, K_MAC and $C\_C_n$ as inputs, the server 20 reproduces the message digest, MD, and compares it to the decrypted message digest. If they do not match, the integrity of the message is deemed to have been compromised and the server 20 reports an error code to the client. If, instead, they match, the integrity of the message is deemed to be fine and the server 20 processes the message body, C_DATA (step 332).

Communications that are initiated by the server 20 are conducted much in the same manner as described above, except that, instead of using the client counter, C_C, the server counter, S_C, is employed.

Figure 7:
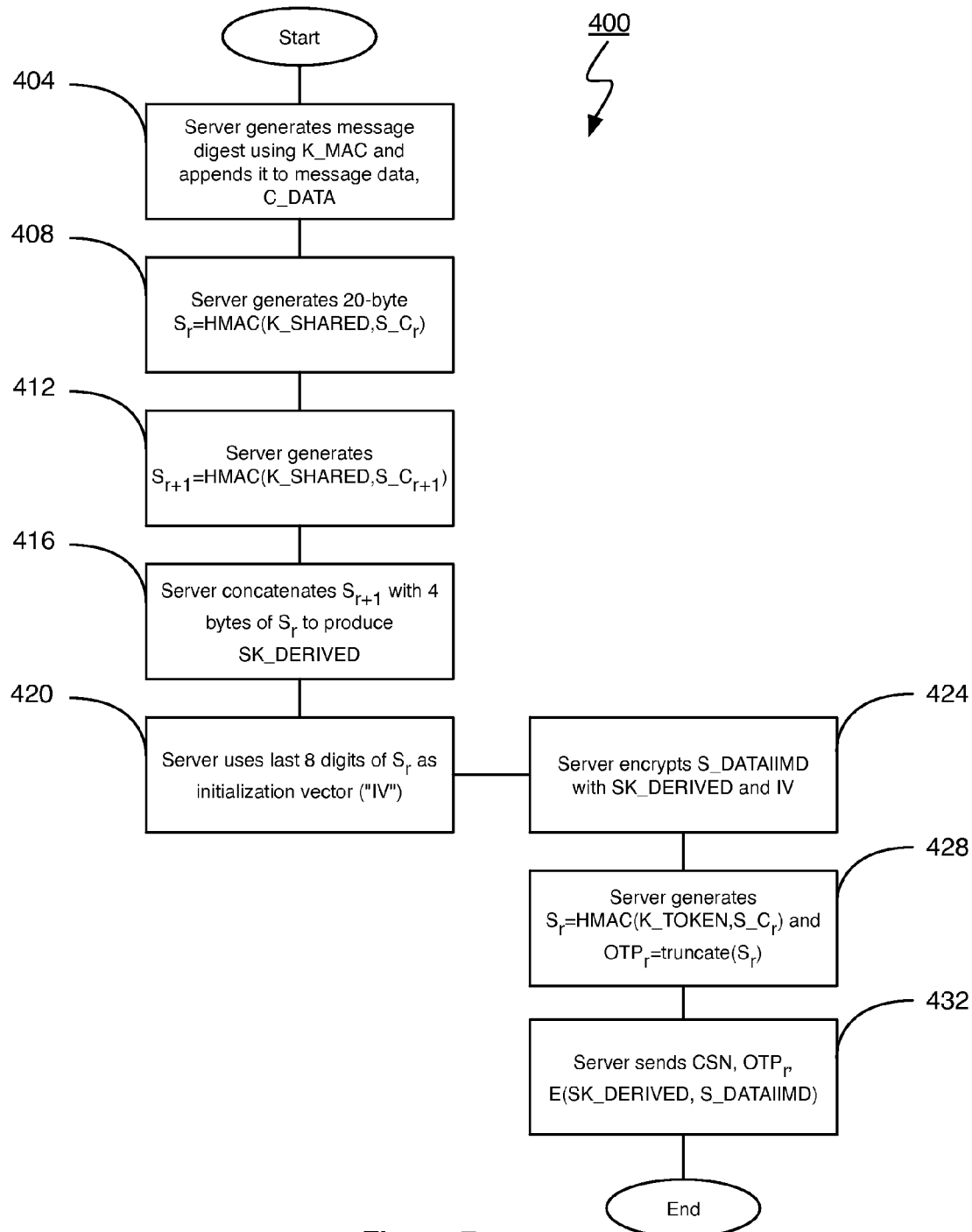
FIG. 7 shows the general method for generating a secure message via the server of the system of FIG. 1.

FIG. 7 illustrates the method employed by the server 20 for generating and sending a secure message to the mobile device 28 using the system shown in FIG. 1 generally at 400. The method begins with the encryption module of the server 20 generating a message digest, MD, for the message to be sent, referred to as S_DATA, using K_MAC and appending the message digest to the message (step 404). Like C_DATA, S_DATA is in XML format. The message digest is a 20-byte HMAC that is calculated as follows:

$$MD = HMAC(K\_SHARED, S\_C_r),$$

where r is an incremental variable, and $S\_C_r$ is the $r^{th}$ (or current) value of the server counter, S_C. In this case, r is used instead of the previously-used n to ensure that it is clear that the client and server counters need not be, and are almost certainly not, in synchronization. The server counter, S_C, is initialized by the server 20 at a random value, $S\_C_0$, during provisioning and incremented sequentially for each use. $S\_C_0$ is selected such that it is highly improbable to experience a collision between S_C and C_C at any time. The particular HMAC function employed in the embodiment is the HMAC-SHA-1 algorithm, as set out in IETF RFC 4226: HOTP: An HMAC-Based One-Time Password Algorithm, although other HMAC functions will occur to those skilled in the art.

The server 20 then commences the generation of an encryption key by generating $S_r$, a 20-byte HMAC (step 408). In particular, $S_r=HMAC(K\_TOKEN,S\_C_r)$.

Again, the HMAC-SHA-1 algorithm is employed to generate the HMAC, $S_r$.

After generating $S_r$, the encryption module generates $S_{r+1}$, another 20-byte HMAC (step 412). In particular, $S_{r+1}=HMAC(K\_TOKEN,S\_C_{r+1})$, where $S\_C_{r+1}=S\_C_r+1$.

The encryption module then concatenates $S_{r+1}$ with the first eight bytes of $S_r$ to generate the session encryption key, SK_DERIVED (step 416). The resulting SK_DERIVED is a 128-bit AES key. The encryption module then establishes an initialization vector ("IV") of the last eight bytes of the HMAC $S_r$ (step 420). The encryption module then encrypts the message, S_DATA, and the appended message digest, MD, using the derived encryption key, SK_DERIVED, concatenated with the initialization vector, IV (step 424). Specifically, 128-bit Advanced Encryption Standard ("AES") is used to encrypt S_DATA and the appended MD.

The server 20 then generates a server OTP, S_OTP, to enable authentication of the server 20 to the client and synchronization of the server counter S_C between the client and the server 20 (step 428). In order to generate S_OTP, the server counter value, $S\_C_r$, and K_TOKEN are used to generate an HMAC, using the SHA-1 algorithm. The HMAC is then processed using the truncate function, as described above. Thus, $S\_OTP=Truncate(HMAC(K\_TOKEN,S\_C_r))$, where S_OTP is a six-digit code.

The server 20 then sends a message to the client that includes CSN, S_OTP, and the encrypted message concatenated with the message digest, S_DATA||MD (step 432). The message is sent via SMS to the communications interface 92 of the mobile device 28.

Once the server 20 has used a server counter value to generate a secure message, it will not be used again in the future. Thus, to generate the next secure message, the server 20 uses $S\_C_{r+2}$ and $S\_C_{r+3}$ to generate the session encryption key.

Figure 8:
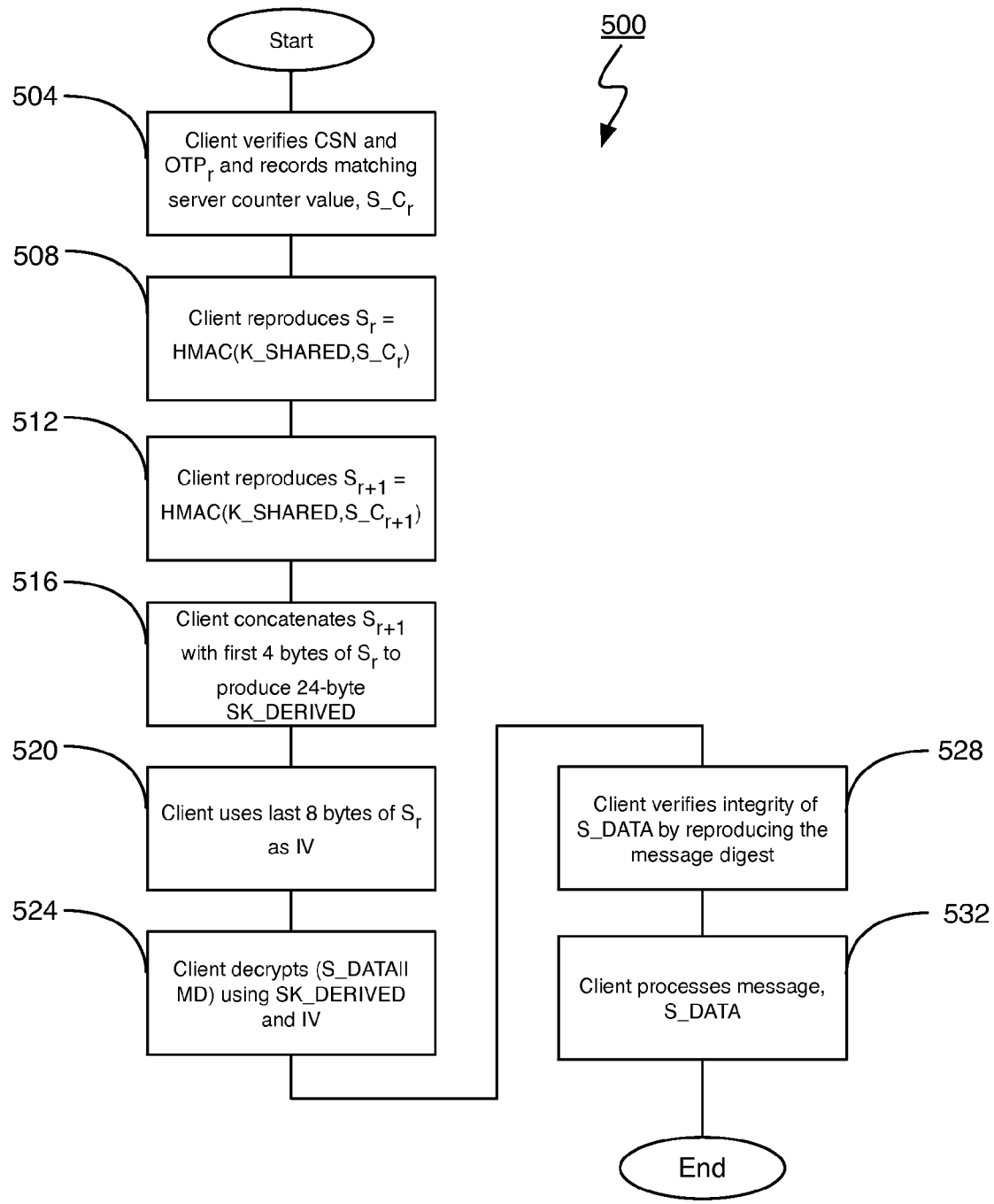
FIG. 8 shows the general method for processing a server-generated secure message via the client of the system of FIG. 1.

FIG. 8 illustrates the method 500 used by the client to process the message received from the server 20 as a result of the server 20 generating and sending a message per the method shown in FIG. 7. Upon receipt of the message from the server 20, the client verifies the CSN and S_OTP and records the matching server counter value (step 504). The client verifies the CSN by checking to ensure that it matches the CSN it was provisioned with by the server 20. Once the CSN is verified, the corresponding keys and counter values are retrieved by the encryption module of the client application. The client then increments the last registered value for the server counter, $S\_C_s$, and generates a corresponding OTP using it and K_TOKEN as follows:

$OTP=Truncate(HMAC(K\_TOKEN,S\_C_s))$, where $S\_C_s$ is the current expected value of the server counter.

If the OTP generated by the client does not match S_OTP sent by the server 20, the server counter value, $S\_C_s$, is incremented by one and another OTP is generated by the client and checked against S_OTP transmitted by the server 20, until either the OTP generated by the client matches S_OTP sent by the server 20 or until a set number of iterations have been exhausted without success. If S_OTP is unmatched by the client, the client responds to the server 20 with an error code and stops processing the message. If, instead, S_OTP is matched by an OTP generated by the client, the corresponding server counter value, $S\_C_r$, is recorded. In this manner, the server counter values stored on the client and the server 20 can be synchronized.

Upon synchronizing the server counter value, the client reproduces the first HMAC used to generate the decryption key using K_SHARED and $S\_C_r$ (step 508). Next, the client increments the server counter value and reproduces the next HMAC using HMAC and $S\_C_{r+1}$ (step 512).

The client then concatenates $S_{r+1}$ with the first eight bytes of $S_r$ to reproduce the session encryption key, SK_DERIVED (step 516). As previously noted, the SK_DERIVED is 128-bits in length. The client then reproduces the initialization vector ("IV") as the last eight bytes of the HMAC $S_r$ (step 520). The client then decrypts the message and appended message digest, S_DATA||MD, using the derived encryption key, SK_DERIVED, concatenated with the initialization vector, IV (step 524). The client then verifies the integrity of the message (step 528). Using the decrypted S_DATA, K_MAC and $S\_C_r$ as inputs, the client reproduces the message digest, MD, and compares it to the decrypted message digest. If they do not match, the integrity of the message is deemed to have been compromised and the client reports an error code to the server 20. If, instead, they match, the integrity of the message is deemed to be fine and the client processes the message body, S_DATA (step 532).

In order to better understand the implementation of the secure messaging method, the protocol will now be discussed.

Figure 9:
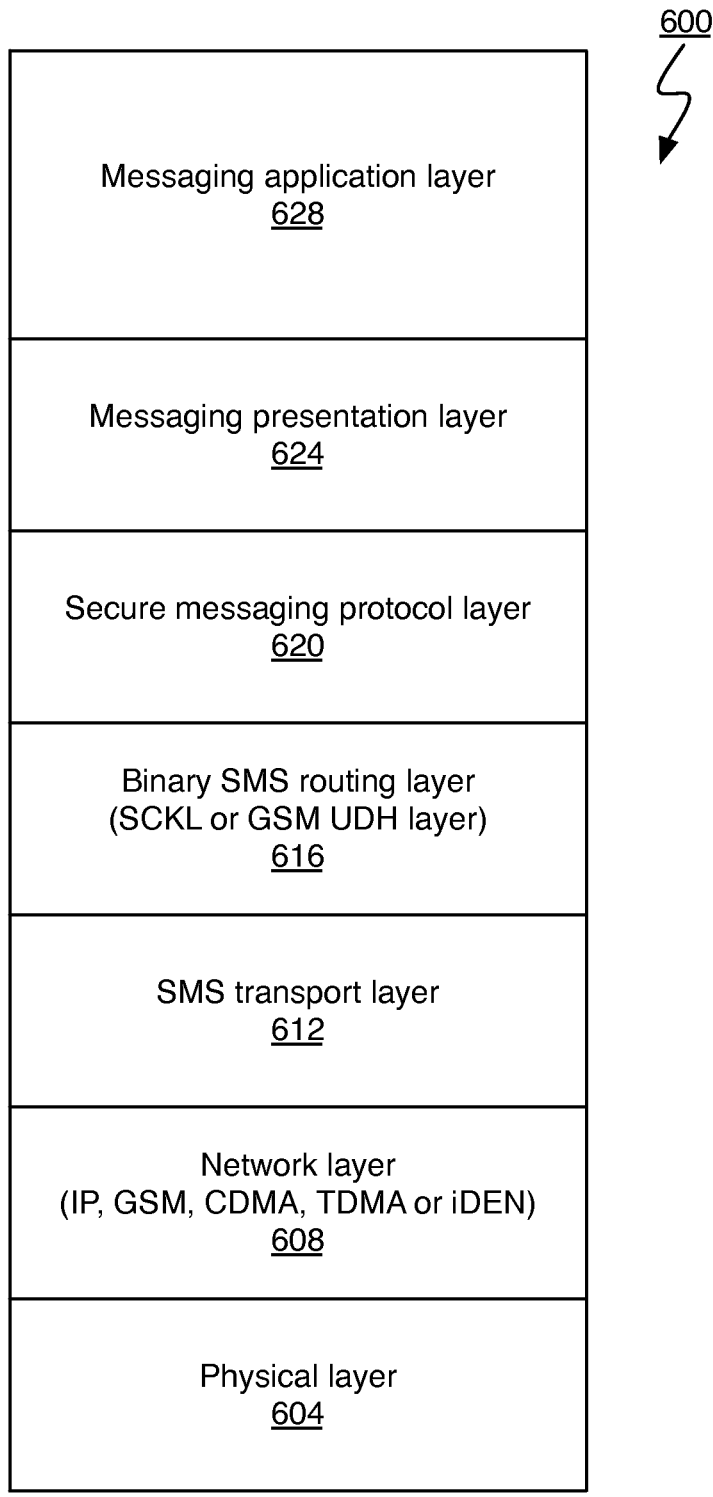
FIG. 9 shows the protocol stack for communications using the system of FIG. 1.

FIG. 9 illustrates the protocol stack 600 for communications between the client and the server 20 of FIG. 1. The protocol stack 600 includes a physical layer 604, a network layer 608, an SMS transport layer 612, a binary SMS routing layer 616, a secure messaging protocol layer 620, a messaging presentation layer 624 and a messaging application layer 628. The physical layer 604 defines the relationship between devices and the physical medium. The network layer 608 provides the functional and procedural means to transfer variable length data sequences between network entities, such as the mobile device 28 and the server 20.

The SMS transport layer 612 handles the end-to-end communication aspects. In this layer, the mobile phone number, MSISDN, is set in the destination address field of mobile-terminated messages, and in the originating address field of mobile-originated messages. The service provider's (running the server 20) Short Code, Virtual Mobile Number (VMN) or SMS Modem number is used in the originating address field of mobile-terminated messages, and in the destination address field of mobile-terminated messages.

At the binary SMS message routing layer 616, the registered port number for the client application executing on the mobile device 28 for SMS transmissions is used as a destination port number in the SCKL header, or UDH header for mobile-terminated messages. In mobile-originated messages, the originating port number may be ignored or set to NULL in the SCKL header or the UDH header. If the server 20 hosts multiple applications, each application may be assigned a different port number as a four-digit number. In this case, mobile-originated messages may include the destination application port number as a destination port number in the SCKL header or the UDH header. In the reverse direction, mobile-terminated messages also include the application port number as originating port number in the SCKL header or UDH header. When the server 20 only hosts one application, the server application port number is ignored or set to null in the SCKL header or UDH header.

At the secure messaging protocol layer 620, message identifiers are used to correlate messages acknowledgments and messages responses with original messages.

At the messaging presentation layer 624 and the messaging application layer 628, the application may include additional sender or recipient identifiers, such as username, email address, first and last name and additional presentation related information such as message subject, message status, message type, display format, etc.

In some cases, messages to be sent via this secure communication method can exceed the maximum length permitted by the messaging application layer 628. In such cases, the message to be transmitted is divided into two or more parts and each part is sent individually.

Figure 10:
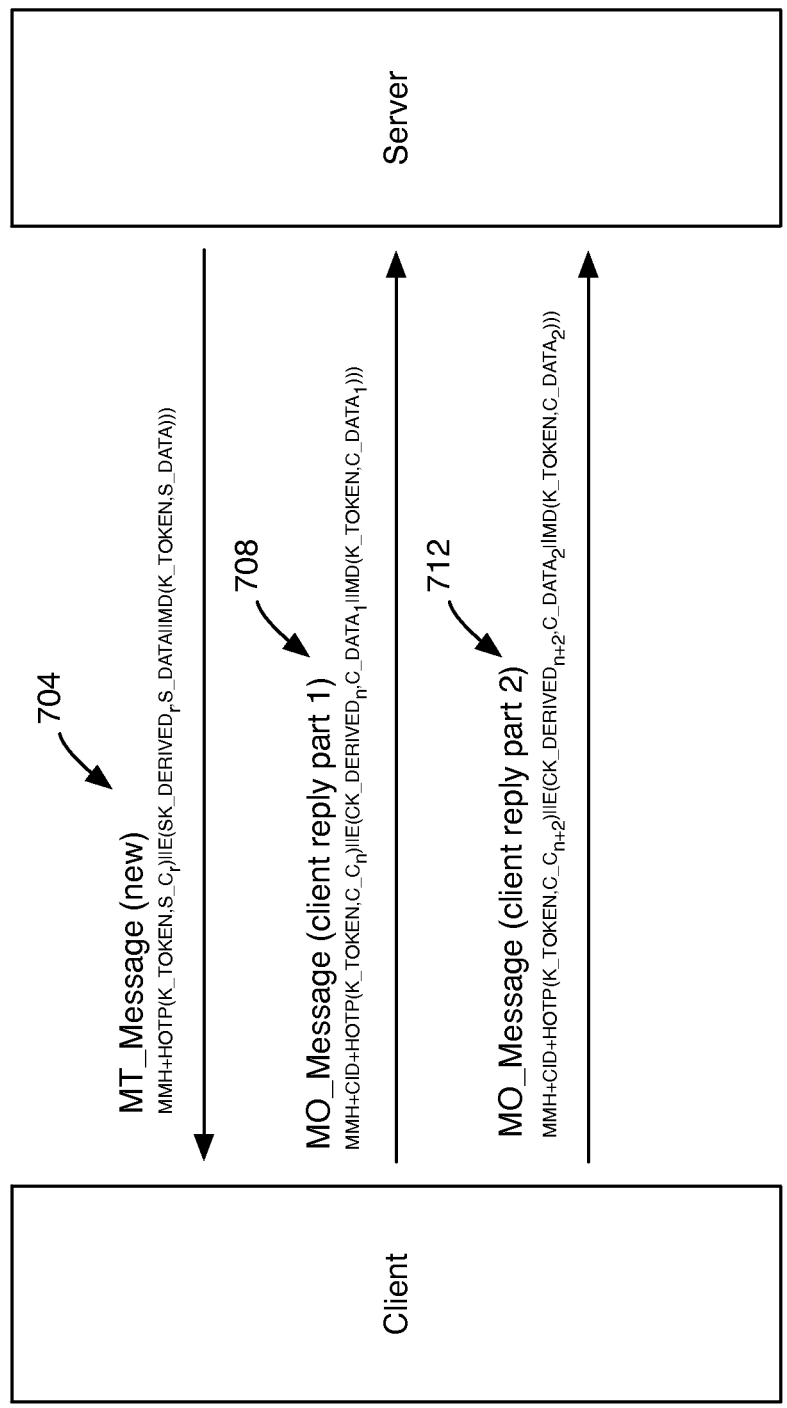
FIG. 10 shows a message exchange using the system of FIG. 1.

FIG. 10 illustrates a communication exchange between the client and the server. As shown, the server 20 initiates the communication by sending a mobile-terminated message 704, requesting data from the client. The data requested from the client, C_DATA, is larger than permitted for a single message and, as a result, the message is broken into two parts, $C\_DATA_1$ and $C\_DATA_2$, that are sent separately. The first part, $C\_DATA_1$, is sent via a first mobile-originated message 708, and the second part, $C\_DATA_2$, is sent via a second mobile-originated message 712. Each of the two mobile-originated messages are encrypted using separate derived encryption keys. As two counter values are required to generate an encryption key for a message, the counter is incremented twice between messages. A message sequence number is placed in the header for each message so that the server 20 is able to reassemble, by concatenation, the data in the messages.

As separate counters are used for the client and the server 20, messages can be encrypted and sent asynchronously between the two.

It can be desirable to avoid collisions between past or present values of C_C and S_C for a number of reasons. If one of the two counters has a value that the other counter previously had or currently has, the derived OTP value for messages between the two parties may be used at least twice and the derived encryption key for messages generated by either party may also be used at least twice. Although authenticated messages are sent in different directions, it can be desirable to only use counter values, and thus derived values, once.

The two counter values, C_C and S_C, can be initialized and incremented in a number of different manners in addition to the manner described above. For example, C_C can be initialized as an even number and S_C as an odd number, with increments to either counter value being by two. Another method is to initialize C_C as a positive integer, incrementing it by +1 each time a new value for C_C is required, and to initialize S_C as a negative integer, incrementing it by −1 each time a new value for S_C is required.

While the invention has been described with specificity to the use of SHA-1, those skilled in the art will appreciate that other types of hash-based message authentication codes can be employed. For example, SHA-256 or SHA-512 can be used in place of SHA-1.

The encryption key can be generated using other functions of two or more HMACs, such as PKCS#5 and other key derivation functions.

Other types of encryption can be used for encrypting the message apart from AES. For example, Triple DES can be used without affecting the working of the invention.

Where an initialization vector is employed, other functions for generating it will occur to those skilled in the art.

In some cases, it may not be necessary to transmit the CSN. For example, where hardware identifiers are accessible, the hardware identifier can be identified during provisioning of the client application on the computing device and can be registered with the security elements stored in the key database. Upon receipt of a message, the hardware identifier can be used to look up the requisite security elements for authenticating, verifying and/or decrypting the message.

The session key can be used for a single message from one computing device to another. Alternatively, the session key can be used for multiple messages or parts of messages.

Other types of computing devices can be set up to work with the invention. For example, a mobile device can be paired via a hardwire connection to a personal computer for provisioning and can thereafter use the invention to carry out messages with the personal computer securely, such as for synchronizing data, etc. Secure communications could be carried out between two mobile devices, machines with computing functionality, personal computers, etc.

While the invention was described with respect to an SMS client application executing on a mobile device, those skilled in the art will appreciate that a number of other types of software and/or hardware could be used. For example, a plug-in can be provided to adapt a native SMS client on a mobile device to conduct secure communications using the general method described above. The software could be any computer-executable instructions for communicating securely with another computing device, and could be implemented in firmware, an operating system, an application, etc.

The information in the communications can be outputted in a number of ways. For example, the information can saved in storage, displayed, printed or passed to an application for further processing.

The invention could be employed to secure communications for a variety of data types, such as, for example, email, MMS, instant messages, etc.

Those skilled in the art will appreciate that, in some cases, the lengths of the various elements used, such as the keys and the initialization vector, could be varied without significantly affecting the invention.

The above-described embodiments are intended to be examples of the present invention and alterations and modifications may be effected thereto, by those of skill in the art, without departing from the scope of the invention, which is defined solely by the claims appended hereto.

What is claimed is:

1. A method for secure communication, comprising:
generating, by a server, a first shared key, a first counter and a second counter;
transmitting, by the server, the first shared key, the first counter and the second counter to a computing device;
encrypting outgoing messages sent over a network to another computing device using the first shared key shared with said other computing device, and the first counter, said first shared key and said first counter being stored in storage of the computing device;
decrypting incoming messages received over said network from said other computing device using said first shared key and the second counter stored in said storage of said computing device;
generating a first hash-based message authentication code from said first shared key and a first value of said first counter;
generating a second hash-based message authentication code from said first shared key and a second value of said first counter; and
generating a first encryption key as a first function of said first hash-based message authentication code and said second hash-based message authentication code, wherein said first and said second counters are asynchronous, and wherein said encrypting comprises encrypting using said first encryption key.

2. The method of claim 1, further comprising:
generating a first one-time password using a second shared key and said first counter.

3. The method of claim 2, further comprising:
communicating said first one-time password to said other computing device to enable determination of the value of said first counter.

4. The method of claim 1, wherein said first function includes at least a portion of a concatenation of said first and second hash-based message authentication codes.

5. The method of claim 1, further comprising:
combining said first encryption key with an initialization vector for encrypting said message.

6. The method of claim 5, wherein said encrypting comprises:
generating an initialization vector as a second function of at least one of said first and second hash-based message authentication codes; and
encrypting said message using said first encryption key concatenated with said initialization vector.

7. The method of claim 6, wherein said generating comprises setting said initialization vector as a portion of said second hash-based message authentication code.

8. The method of claim 1, further comprising:
communicating an identifier for said first shared key and said first counter with an encrypted message.

9. The method of claim 1, further comprising:
receiving a second one-time password from said other computing device; and
synchronizing said second counter using said second one-time password.

10. The method of claim 9, further comprising:
generating a third hash-based message authentication code from said first shared key and a first value of said second counter;
generating a fourth hash-based message authentication code from said first shared key and a second value of said second counter; and
generating a second encryption key as a first function of said third hash-based message authentication code and said fourth hash-based message authentication code,
wherein said decrypting comprises decrypting using said second encryption key.

11. A system for secure communication, comprising:
a server generating a first shared key, a first counter and a second counter, and transmitting the first shared key, the first counter and the second counter to a computing device;
the computing device having a storage storing the first shared key, and the first counter and the second counter, and a processor executing an encryption module, said encryption module for encrypting outgoing messages sent over a network to another computing device using the first shared key and for decrypting incoming messages received over said network from said other computing device using said first shared key and said second counter, said other computing device also storing said first shared key and said first and second counters;
wherein said first and said second counters are asynchronous,
and wherein said encryption module generates a first hash-based message authentication code from said first shared key and a first value of said first counter, and a second hash-based message authentication code from said first shared key and a second value of said first counter, said encryption module generating a first encryption key as a first function of said first hash-based message authentication code and said second hash-based message authentication code, and encrypting one of said outgoing messages using said first encryption key, said encryption module causing said network interface to communicate said one encrypted outgoing message.

12. The system of claim 11, wherein said encryption module generates a first one-time password using a second shared key and said first counter.

13. The system of claim 12, wherein said computing device communicates said first one-time password to said other computing device to enable determination of the value of said first counter.

14. The system of claim 11, wherein said first function includes at least a portion of a concatenation of said first and second hash-based message authentication codes.

15. The system of claim 11, wherein said encryption module combines said first encryption key with an initialization vector for encrypting said one outgoing message.

16. The system of claim 15, wherein said encryption module generates an initialization vector as a second function of at least one of said first and second hash-based message authentication codes, and encrypts said one outgoing message using said first encryption key concatenated with said initialization vector.

17. The system of claim 16, wherein said encryption module sets said initialization vector as a portion of said second hash-based message authentication code.

18. The system of claim 11, wherein said encryption module communicates an identifier for said shared key and said first counter with one encrypted outgoing message.

19. The system of claim 11, wherein said encryption module synchronizes said second counter with said other computing device using a second one-time password received therefrom.

20. The system of claim 19, wherein said encryption module generates a third hash-based message authentication code from said first shared key and a first value of said second counter, a fourth hash-based message authentication code from said first shared key and a second value of said second counter, and a second encryption key as a first function of said third hash-based message authentication code and said fourth hash-based message authentication code, wherein said encryption module decrypts one of said incoming messages using said second encryption key.

21. A method for secure communication, comprising:
generating, by a server, a first shared key, a first counter and a second counter;
transmitting, by the server, the first shared key, the first counter and the second counter to a computing device and to another computing device;
encrypting outgoing messages sent over a network to said other computing device using the first shared key shared with said other computing device, and the first counter, said first shared key and said first counter being stored in storage of the computing device;
decrypting incoming messages received over said network from said other computing device using said first shared key and the second counter stored in said storage of the computing device;
receiving a second one-time password from said other computing device; synchronizing said second counter using said second one-time password;
generating a third hash-based message authentication code from said first shared key and a first value of said second counter; generating a fourth hash-based message authentication code from said first shared key and a second value of said second counter; and generating a second encryption key as a first function of said third hash-based message authentication code and said fourth hash-based message authentication code, wherein said first and said second counters are asynchronous, and wherein said decrypting comprises decrypting using said second encryption key.

22. A system for secure communication, comprising:

a server generating a first shared key, a first counter and a second counter, and transmitting the first shared key, the first counter and the second counter to a computing device;

the computing device having a storage storing the first shared key, and the first counter and the second counter, and a processor executing an encryption module, said encryption module for encrypting outgoing messages sent over a network to another computing device using the first shared key and for decrypting incoming messages received over said network from said other computing device using said first shared key and said second counter, said other computing device also storing said first shared key and said first and second counters;

wherein said first and said second counters are asynchronous, wherein said encryption module synchronizes said second counter with said other computing device using a second one-time password received therefrom, and wherein said encryption module generates a third hash-based message authentication code from said first shared key and a first value of said second counter, a fourth hash-based message authentication code from said first shared key and a second value of said second counter, and a second encryption key as a first function of said third hash-based message authentication code and said fourth hash-based message authentication code, wherein said encryption module decrypts one of said incoming messages using said second encryption key.

* * * * *